United States Patent [19]
Smallbone et al.

[11] 3,833,845
[45] Sept. 3, 1974

[54] TOUCH BUTTON CONTROL SYSTEM

[75] Inventors: Christopher R. Smallbone, Port Colborne; Laurent W. Beaudoin, Welland, Ontario, both of Canada

[73] Assignee: General Signal Corporation, Rochester, N.Y.

[22] Filed: July 18, 1973

[21] Appl. No.: 380,416

[52] U.S. Cl. .............................. 318/305, 318/345
[51] Int. Cl. ............................................. H02p 5/16
[58] Field of Search .................... 318/305, 341, 345

[56] References Cited
UNITED STATES PATENTS
3,612,969  10/1971  Cockroft .......................... 318/305

*Primary Examiner*—Robert K. Schaefer
*Assistant Examiner*—Thomas Langer
*Attorney, Agent, or Firm*—Milton E. Kleinman; Harold S. Wynn; John Ohlandt

[57] ABSTRACT

An electronic control system especially adapted to control a universal motor with respect to predetermined speeds, in order to provide a variety of desired functions, and with respect to its energization time.

11 Claims, 3 Drawing Figures

PATENTED SEP 3 1974 3,833,845

TOUCH BUTTON CONTROL SYSTEM

BACKGROUND, OBJECTS AND SUMMARY OF THE INVENTION

This invention relates to a control system or to motor control circuitry especially adapted for the control of a universal motor both in respect to the speed of operation of such motor and to the overall time period for motor operation in performing a number of functions.

There has appeared on the market in the past few years or so a great variety of automatic blenders which are designed to offer a selection of functions such as chopping, grinding, liquefying etc. This variety of functions is enabled by reason of the fine degree of control that can be exercised over the speed of a blender motor. Typically, such fine control in discrete steps is effectuated by a pushbutton array at the front panel of the blender. For an example of such blender construction, reference may be made to U.S. Pat. No. 3,550,657 to Swanke. The blender device described in this Swanke patent is provided with a plurality of pushbuttons which are effective to control combinations of switches in such a way as to select discrete speeds over a wide range. The pushbuttons are mechanically interlocked; that is to say, only one pushbutton can be pushed in at a given time so as to select a particular speed for the blender motor. Moreover, the selected pushbutton remains in until another choice of speed is made.

It should be noted that many blenders also include an automatic timer that shuts down the blender motor after the particular task, which may involve several different grinding, blending or shipping functions, is completed. In particular, the aforesaid Swanke patent provides a manually set but automatically operating electromechanical timer which acts upon completion of the overall cycle time, that is, the time for the performance of all of the variety of functions, so as to interrupt the power supply and hence stop the blender motor.

It has been found to be highly desirable to be able to control the discrete motor speeds by electronic means and further to control electronically the time for the complete cycle of operation of the motor.

Accordingly, it is a basic object of the present invention to achieve fine control over motor speed by the use of simple "touch buttons", that is, control elements which eliminate complicated, mechanically, interrelated parts and provide instead a simple movable contact which makes only momentary contact with a fixed contact.

It will be readily apparent that when touch buttons are used, it becomes necessary to have an arrangement for remembering which one of the plurality of touch buttons has been actuated so that the motor speed may be "latched in", so to speak, for a particular desired time interval.

For some examples of momentary contact or touch button switching, reference may be made to U.S. Pat. No. 3,641,410 to Vogelsberg and U.S. Pat. No. 3,699,359 to Shelby. However useful and effective the Shelby scheme may be with certain kinds of tuning devices and the like as suggested in the disclosure of that patent, such scheme is quite complicated, requires use of a large number of transistors and diode devices and is not amenable to simplified electronic control over the time duration or time period for the cycle of operation of the motor, unless an electro-mechanical timer is to be utilized.

It is, therefore, a further object of the present invention to provide extremely simple control means for achieving discrete, selective control over motor operating speeds.

Yet another object is to combine uniquely and in simplified fashion both the discrete control over motor speed and control over the complete cycle of operation, that is, the energization time for the motor, such that the motor will shut down or be turned off in a time period that is electronically determined, rather than by an electromechanical switch.

The above objects and other related objects are fulfilled and implemented by a primary feature of the present invention which resides in a simplified touch button-memory arrangement. In accordance with such arrangement, a potentiometer is connected across a suitable source of D.C. power, and a plurality of touch buttons are connected to discrete points on a network of resistors defining the potentiometer so that selected voltages can be applied to a memory device in the form of a capacitor. The capacitor is capable of long term charge or voltage storage and hence, can serve to remember which touch button was last actuated for a time period considerably in excess of that selected by the energization timing control. Typically, the long term storage capacitor would have the capability of storing charge for an hour, while the energization timing control would be set for a time period anywhere from one second to sixty seconds.

In accordance with a further feature of the present invention, the aforesaid touch button-memory arrangement is connected as part of a motor control circuit; specifically for the purpose of controlling the speed of a blender motor. This motor control circuit essentially comprises a universal motor, connected in series with a control device such as a silicon controlled rectifier whose high conductance state can be triggered in accordance with a signal applied to its control gate or electrode. Accordingly, a trigger circuit is suitably connected to the gate electrode whereby variation in the time constant of the trigger circuit results in changing the firing angle of the silicon controlled rectifier with the result that the speed of the motor can thereby be varied.

A control circuit known in the art for accomplishing the general purpose of varying motor speed by changing the firing angle of a controlled rectifier device can be appreciated by reference to U.S. Pat. No. 3,460,017 to Eggleston et al. However, the present invention also provides that the capacitor memory can accept a variety of discrete voltages applied to it from a network of resistors, connected thereto. The voltages thus impressed constitute the memory parameter and remain isolated from the output of a suitably connected transistor.

It should be especially noted that one of the fundamental advantages of the control system of the present invention is that it provides for precise control in discrete steps of motor operating speeds so that the user is afforded certainty of motor speed in accordance with the touch button that is actuated. This is superior to a conventional continuous control in that the speeds most frequently utilized have been programmed or predetermined whereby great convenience is realized because selection of motor speed does not have to be guessed at.

The above and other objects, features and advantages of the present invention will be understood by reference to the following description taken in connection with the accompanying drawing.

DESCRIPTION OF PREFERRED EMBODIMENT

Figure 1:
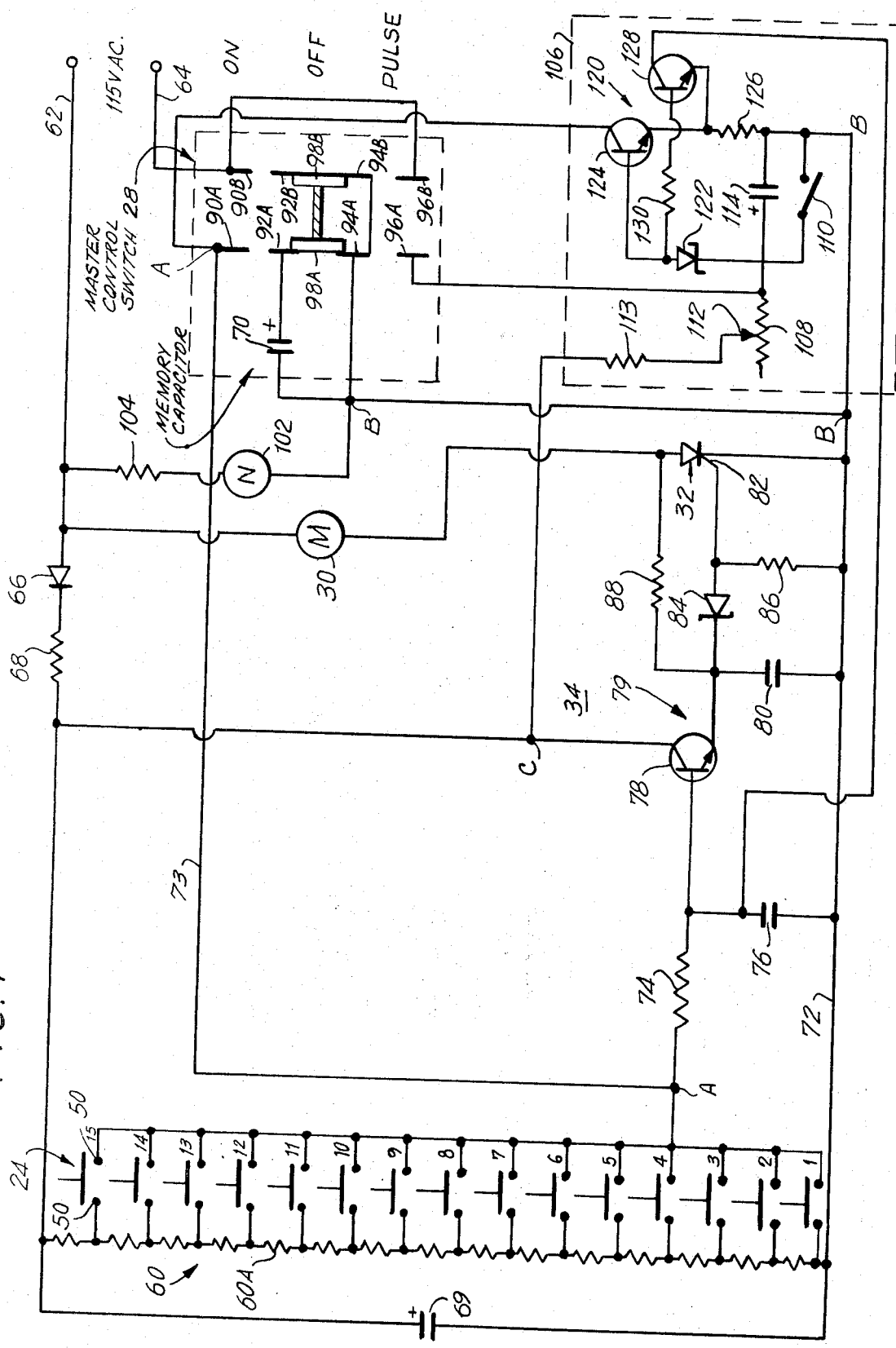
FIG. 1 is a schematic diagram illustrating a preferred embodiment of the circuit aspects of the system of the present invention.

Referring now to the drawing, it will first of all be understood that the control system of the present invention has for its basic purposes the control of the speed of a universal motor, especially one adapted to the driving of a blender cutting device; also, the control of the motor energization time period. Accordingly, there will be seen in FIG. 2 a blender 20 which includes a console 22 divided into sections. The section on the right includes a plurality of touch buttons 24 which control suitable switch contacts; on the left, there are provided a timer 26 and a master control switch 28. The touch buttons 24 are selectively actuated for the purpose of controlling the speed of the universal motor 30 (FIG. 1). The motor 30 is shown schematically since the series connected field windings and armature of such motor are conventional. The motor 30 has its speed determined by the control device in the form of a silicon controlled rectifier 32 which is connected in series with the motor. For convenience, the control circuitry which affects the triggering of the silicon controlled rectifier 32 is generally designated 34 and includes the aforesaid touch buttons 24.

Figure 3:
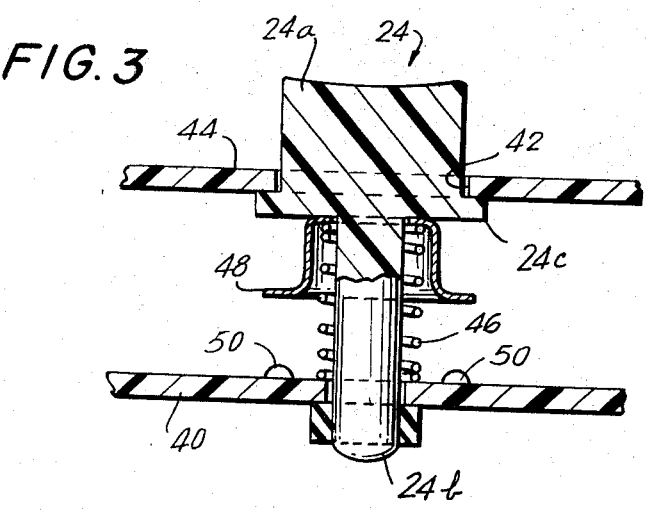
FIG. 3 is an enlarged sectional view of one of the typical touch buttons utilized in the control system of the present invention.

Each of the touch buttons 24 is of the construction illustrated in FIG. 3. Thus, each of the touch buttons comprises a plastic cap 24A, including integral flanges 24C, and an elongated stud 24B which is adapted to pass through a suitable opening in a printed circuit board 40. The plastic cap 24A fits in a recess 42 which is formed in a plastic member constituting the upper wall 44 of the console 22. By reason of the biasing provided by the spring 46, the flanges 24C formed at the periphery of the cap 24A are forced against the wall 44. A bell-shaped contact 48 surrounds the stud 24B and is operative to engage the spaced contacts 50 on the circuit board 40, thereby completing selected individual paths as will be appreciated by reference to FIG. 1, wherein like parts are shown schematically.

It will also be noted in FIG. 1 that each of the touch buttons 24 is connected to an appropriate point on a resistor network 60 and accordingly, each of a plurality of voltage values may be selected by actuation of the appropriate one of the touch buttons 24.

Power is available at the touch button switches by reason of the fact that an appropriate power source is connected across the lines 62 and 64, as seen at the upper right in FIG. 1. Typically, the power source has a value of 115 volts AC. Application of power is controlled by the master control switch 28, also shown at the upper right in FIG. 1. AC power is converted to DC by the inclusion in line 62 of the diode 66; also included is a resistor 68 in selectively applying DC power to the several circuit components, including the resistor network 60 and the touch buttons 24. A smoothing capacitor 69 is connected across the voltage divider 50 for the purpose of smoothing out the pulsating DC to produce a substantially constant DC voltage. Return of power from the several components is by way of line 72 to the master control switch 28 and thence to the return power line 64.

Provision is made for selective connection of memory capacitor 70, seen adjacent the portion labelled Master Control Switch 28, in the event that the memory function is to be effectuated in the control system. Such connection is by line 73 from the point marked A at the common output of the touch buttons 24. Accordingly, capacitor 70 is connectable between point A and the reference point B which is shown both adjacent the master control switch 28 and as the common reference point for the circuit components.

Also connected between point A and point B is a resistor 74, of appropriately high value such as 10 megohms, and, in series therewith, a capacitor 76, having a typical value of .0047 microfarads. It will be noted that the upper end of capacitor 76 is connected to the base of an NPN transistor 78. The capacitor 76 functions simply as a noise suppression device, unlike the memory capacitor 70 which is a long term storage capacitor having a value of approximately 22mfd. This long term is typically of the order of one hour which is a time much in excess of what would be normally expected for the setting of a particular energization time, that is, an overall time period for operation of the blender motor in performing multiple functions.

The transistor 78 has its collector connected to the low potential end of the resistor 68. The emitter of transistor 78 is connected to a nonpolarized capacitor 80, which forms part of an R-C network, such network also including the conductance of the transistor 78. As will be brought out hereinafter, it is the variation in the conductance of the transistor 78, appropriately effectuated by selective actuation of the touch buttons 24, that results in changing the charging rate of capacitor 80, thereby changing the triggering or firing angle of the SCR device 32. In other words, the point during a particular half wave of the power supply at which capacitor 80 has charged sufficiently, determines when the gate electrode of SCR device 22 has reached a sufficient potential to render the SCR device completely conductive so as to permit armature current flow and hence, to control the speed of motor 30. Also included as part of the triggering circuit for the device 32 and connected between the upper end of capacitor 80 and the gate electrode 82 of the device 32 is a Zener diode 84. A resistor 86 is connected between the gate electrode and the cathode of device 32. Also connected to the upper end of capacitor 80 is a resistor 88 whose other end is connected to the anode of device 32. The function of resistor 88 is to empty capacitor 80 during the negative half cycle of the power wave.

The master control switch 28, which was briefly referred to previously in regard to the selective connection of the capacitor 70, also provides other functions. This switch 28 includes four pairs of fixed contacts: 90A and B, 92A and B, 94A and B, and 96A and B. It is to be particularly noted that contacts 94A and 94B are strapped together and that contacts 92B and 94B are also strapped together, whereby these three individual contacts effectively form one extended contact. A pair of movable contacts 98A and B are designed to be moved together so as to bridge desired ones of the fixed contacts.

It will be seen that the AC power supply is connected to the motor 30 and the device 32 and that, in accordance with the characteristics of device 32, only the positive half wave will be conducted and it is only during this positive half wave that control is exercised by control circuit 34 for reasons that are apparent. However, this kind of half wave control is not the only way in which the present invention could be embodied; that is to say, a full wave control could also be employed.

Also connected to the AC side is a circuit which includes a neon lamp 102 and also a dropping resistor 104 so that a suitably low voltage will be applied across the neon lamp. The return for the neon lamp circuit is through the appropriate contacts of control switch 28.

Figure 2:
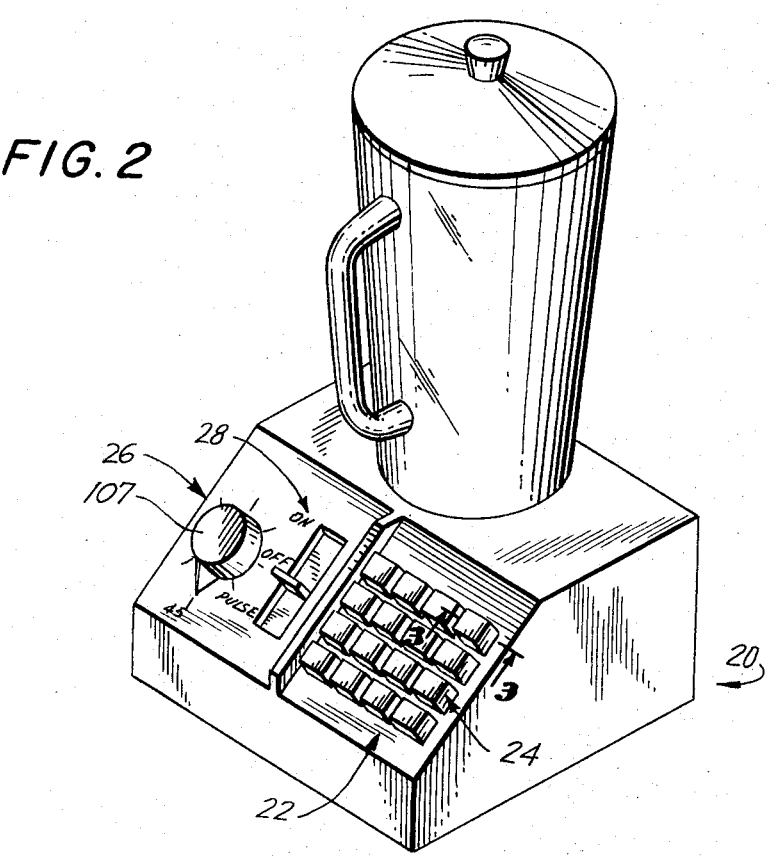
FIG. 2 is a perspective view of a blender device in which the control system of the present invention may be incorporated.

Referring now to the box designated 106 in FIG. 1, there is provided therein a timer control arrangement which is effectuated by operation of the timer 26, including timer dial 107, seen in FIG. 2. The timer dial 107 affects both a potentiometer 108 and a switch 110 (FIG. 1) which is normally in its closed position; that is, normally closed when the timer dial 107 has not been moved from its zero or home position. The movable arm 112 of potentiometer 108 is connected by way of a resistor 113 to point C, to which the collector of transistor 78 is likewise connected.

The switch 110 in its normally closed position shorts out and hence is effective to discharge a capacitor 114. One end of this capacitor 114 is connected to reference point B and the other end is connected to the timer circuit 120. Specifically, the connection is to the cathode end of a Zener diode 122, the anode end of which is connected to the base of a transistor 124. The emitter of this transistor is connected by way of a resistor 126 to reference point B and the collector to point A. Thus the output circuit of transistor 124 is shunted across memory capacitor 70. Also included is an additional transistor 128 for purposes to be explained. This transistor has its emitter connected in common with the emitter of transistor 124, its base to the anode of diode 122 via resistor 130, and its collector to the upper end of capacitor 76.

OPERATION

In the operation of the control system of the present invention and, in particularly, in the operation for the purpose of providing a number of functions in a blender device, the Master Control Switch 28 is placed in one of three possible positions. In the middle position the blender is OFF and the motor as well as all the other components have no power applied to them. This can be appreciated by reference to the position of the movable switch contacts 98A and 98B which, as shown in FIG. 1, are in this middle or OFF position whereby the return line 64 is disconnected. It will be noticed that with the movable contact 98A bridging the fixed contacts 92A and 94A there is a direct short across capacitor 70 so that this capacitor is placed in the discharged state.

When, however, the Master Control Switch 28 is moved from the middle or OFF position to the upper or ON position, AC circuits are established both for the neon light 102, which serves to indicate that the unit is now powered up, and for the motor 30 and control device 32. This occurs because of the aforenoted strapping connections and because of the positioning of movable contact 98B, whereby it now bridges fixed contacts 90B and 92B so that the return is established by way of line 64.

At the same time that the AC circuits become established, a DC voltage of approximately 20 volts becomes available across the touch button switches 24. This results, as explained previously, because of the rectification provided by diode 66, the lowered voltage value being effectuated by the resistor 68. The DC voltage is impressed across the full resistance of the potentiometer 60 and is of substantially constant value because of the inclusion in the circuit of the capacitor 69.

Under the assumption that none of the touch buttons 24 has been depressed, the motor 30 will not operate inasmuch as the negative half wave of the AC is always completely blocked by the device 32, while the positive half wave is ineffective so long as transistor 78 is non-conducting. Such transistor will have insufficient bias at its input until a touch button has been depressed. Accordingly, there can be no charging of the capacitor 80 at this time. However, when any of the buttons which are numbered 1–15 is actuated, a particular motor speed is thereby selected. The buttons are numbered in the order of increasing speed for the motor 30.

It should be especially noted at this juncture that the plurality of resistor sections 60A that make up the potentiometer 60 are not equal in value. These resistor sections are especially tailored in order that an appropriate speed corresponding to a desired function to be produced will be automatically realized by depressing a given touch button. In other words, there is no need on the part of the user to hunt uncertainly for the proper speed for the function to be accomplished.

In a typical design, it was found that, taking into account the transistor transfer characteristics involved, a value of 8.09 volts was desirably attained by actuation of touch button 1 so as to result in a motor speed of 7,000 RPM. Other typical values were 8.24 volts corresponding to 8,000 RPM by actuation of touch button 2, and 8.44 volts corresponding to 9,000 rpm by actuation of touch button 3. These examples are merely illustrative and are not to be taken as limiting with respect to the invention.

The desired motor speed is achieved by reason of the fact that actuation of any of the touch buttons 24 results in so charging capacitor 70 as to produce a voltage value corresponding with the particular button selected. Accordingly, a bias voltage of sufficient magnitude is impressed on the base of transistor 78 by way of the resistor 74 to turn on transistor 78. The particular voltage selected by the touch button acts to produce a particular output impedance (or conductance) for transistor 78, which forms part of the RC network 79, such that capacitor 80 therein is charged positively at a predetermined rate during the positive half wave of the voltage supplied from the 115 volt AC source. The degree of conductance of transistor 78 determines this charging rate; consequently, the degree of conductance determines the point during the positive half wave at which the capacitor 80 will have charged sufficiently to produce a voltage effective to cause the Zener diode 84 to break down. Breakdown of the Zener diode results in triggering the SCR device 32 to a state of complete conduction, thereby allowing current to flow through the motor 30. The triggering of device 32 is a consequence of the discharge of Capacitor 80 into the gate electrode and shunting resistance 86.

It will be appreciated that the higher the value of the bias voltage applied at the input of transistor 78, the greater will be the output conductance thereof; hence, the faster the charging rate and the earlier in the positive half wave that the device 32 will become conductive. As a consequence of a faster charging rate, the higher will be the speed obtained for motor 30. It will further be understood by those skilled in the art that, because of the isolation provided by the transistor 78, there will be no significant leakage of charge from capacitor 70 as it functions for memory purposes. Therefore, the bias voltage at the input of transistor 78 remains established until another speed choice is effected by subsequent actuation of a different touch button from the previous one "being remembered". Accordingly, it will be understood that the present invention enables the "latching in" of particular values of output conductance to an appropriate circuit for control purposes by an extremely simple and reliable means. Moreover, this control is effectuated in response to actuation of a simple momentary contact device.

The mode of operation just described above is conveniently called the Manual Mode; that is, a mode which does not involve use of the timer 26. Such timer permits automatic operation whereby the blender is automatically shut down after the time period set by the timer has expired. As in the aforesaid Manual Mode, when the Timing Mode is desired the unit is powered up in the same manner by moving the control switch 28 from the OFF to the ON position. The timer 26 is set to a predetermined position by turning dial 107 so as to affect timer control 106. For example, let us say, the dial is set to the 30 second position out of a total of perhaps 60 seconds. When the dial 107 is thus set, the switch 110 is automatically opened thereby permitting charging of the capacitor 114. The charging rate is selected by reason of the position of the movable arm 112 on the potentiometer 108. As was the case before in the Manual Mode, the motor speed is then selected by actuation of one of the touch buttons 24. However, after a repertoire of functions has been performed and the 30 seconds timing interval has expired, the capacitor 114 will then have been charged to a point where it will produce breakdown of the Zener diode 122 in the timer circuit 120. This results in switching the transistor 124 to the conductive state such that a substantial short circuit is provided across the capacitor 70 whereby the capacitor 70 is substantially discharged. As a consequence, there is no longer sufficient bias at the base of transistor 78 and the motor 30 will stop. However, the neon lamp 102 will remain energized until control switch 28 is moved to the OFF position.

It will be appreciated that once transistor 124 has been turned on, due to the breakdown of Zener diode 122, it will remain on due to the D.C. bias then applied to the input of transistor 124 by reason of the connection from point C through resistor 113, potentiometer 108, and the conductive diode 122. At the same time, the transistor 128, coupled to transistor 124, is also turned on and is likewise kept on. The function of transistor 128 is to ensure that when the timing period set for the timer circuit has terminated, there will be no possibility of a spurious bias condition existing sufficient to turn on motor 30. This is positively ensured because of the connection from the top of capacitor 76 to the collector of transistor 128.

The transistors 124 and 128 remain on together only until either power is switched off by reason of actuation of master control switch 28 or the timer 26 is returned to the normal position, at which point switch 110 is closed.

A further mode of operation is provided for the blender 10 by an additional position for the control switch 28: namely, the Pulse position, which is the lowest position for the switch. In this position, because of the strapping connection between fixed contacts 94A and 94B, and the bridging of contacts 94B and 96B by movable contact 98B, the neon lamp 102 will again be ON and power is likewise supplied to the motor 30. However, the capacitor 70 is now out of the circuit because the line 73 is now not connected through the switch contacts 90A and 92A. Since capacitor 70 cannot therefore be charged, the motor 30 will only operate when a predetermined touch button is held down and will continue to operate only when a button is so held. It will be noted that the contact 96A is provided as part of the control switch assembly. This contact produces, upon selection of the pulse mode of operation, shorting out of Capacitor 114, and hence removal of the charge that may have been stored therein. This is done in order to cancel and render ineffective any timer setting that had been previously established.

Although a particular embodiment of the invention has been illustrated, it will, of course, be understood that the invention is not limited to this embodiment. In particular, as was mentioned before, the present invention is not limited to half wave control but rather full wave control can also be utilized. Also, a wide range of resistance values can be selected in arranging the potentiometer 60. It will therefore be appreciated that many modifications in the control system may be made by those skilled in the art.

What is claimed is:

1. A touch button control memory system comprising:
    a. a potentiometer having a plurality of movable switch contacts, including individual switching means for selectively actuating each of said contacts only for a moment so as to establish contact to respective points of predetermined voltage values on said potentiometer;
    b. a memory device in the form of a long-term storage capacitor including means for selectively storing any one of said predetermined voltage values in response to the momentary actuation of a particular one of said movable switch contacts, and further including means for isolating said capacitor so that it continues to store said one value after deactuation of the respective individual switching means; and
    c. a translating device connected to said memory device for translating the voltage values stored therein to corresponding stored impedance values.

2. A system as defined in claim 1, in which a charging circuit is provided, said impedance values of said translating device constituting part of said charging circuit.

3. A system as defined in claim 2, further comprising a motor and a control device in series with said motor; another capacitor, forming part of said charging circuit and connected to a gate electrode of said control device, the charging rate of said other capacitor being effective to determined the firing angle of said control device, thereby to control the period during a predetermined power supply cycle when said motor is conducting.

4. A system as defined in claim 3, further comprising a Zener diode connected between said other capacitor in said charging circuit and the gate electrode of said control device.

5. A system as defined in claim 4, in which a timer control is included, comprising an RC network connected to the input of another transistor, the output circuit of said other transistor being connected across said memory capacitor.

6. A system as defined in claim 1 in which said translating device is a transistor and said memory capacitor is connected to the base of said transistor, the other capacitor being connected to the emitter thereof.

7. A system as defined in claim 6, in which another resistor is connected between the emitter of said transistor and the anode of said control device.

8. A system as defined in claim 1, further comprising a master control switch means for switching the memory device into its appropriate circuit and for connecting AC power to said system.

9. A system as defined in claim 8, in which said master control switch includes means for shorting out said memory capacitor when said control switch is in its OFF position.

10. A system as defined in claim 1, further including means providing a DC supply across said potentiometer, said movable switch contacts having one side thereof connected in common to said memory capacitor and the other side respectively connected to said selected points on said potentiometer.

11. A system as defined in claim 1, in which said potentiometer is formed by a network of resistors in series, the individual resistors between selected points on the potentiometer being of unequal value.

* * * * *

Disclaimer 3,833,845.—*Christopher R. Smallbone*, Port Colborne, and *Laurent W. Beaudoin*, Welland, Ontario, Canada. TOUCH BUTTON CONTROL SYSTEM. Patent dated Sept. 3, 1974. Disclaimer filed Mar. 17, 1975, by the assignee, *General Signal Corporation*.

Hereby enters this disclaimer to claims 4–11 of said patent.

[*Official Gazette July 22, 1975.*]